(No Model.)
W. F. LOUNSBURY.
AUTOMATIC TELEPHONE EXCHANGE SYSTEM.
No. 551,391.                            Patented Dec. 17, 1895.
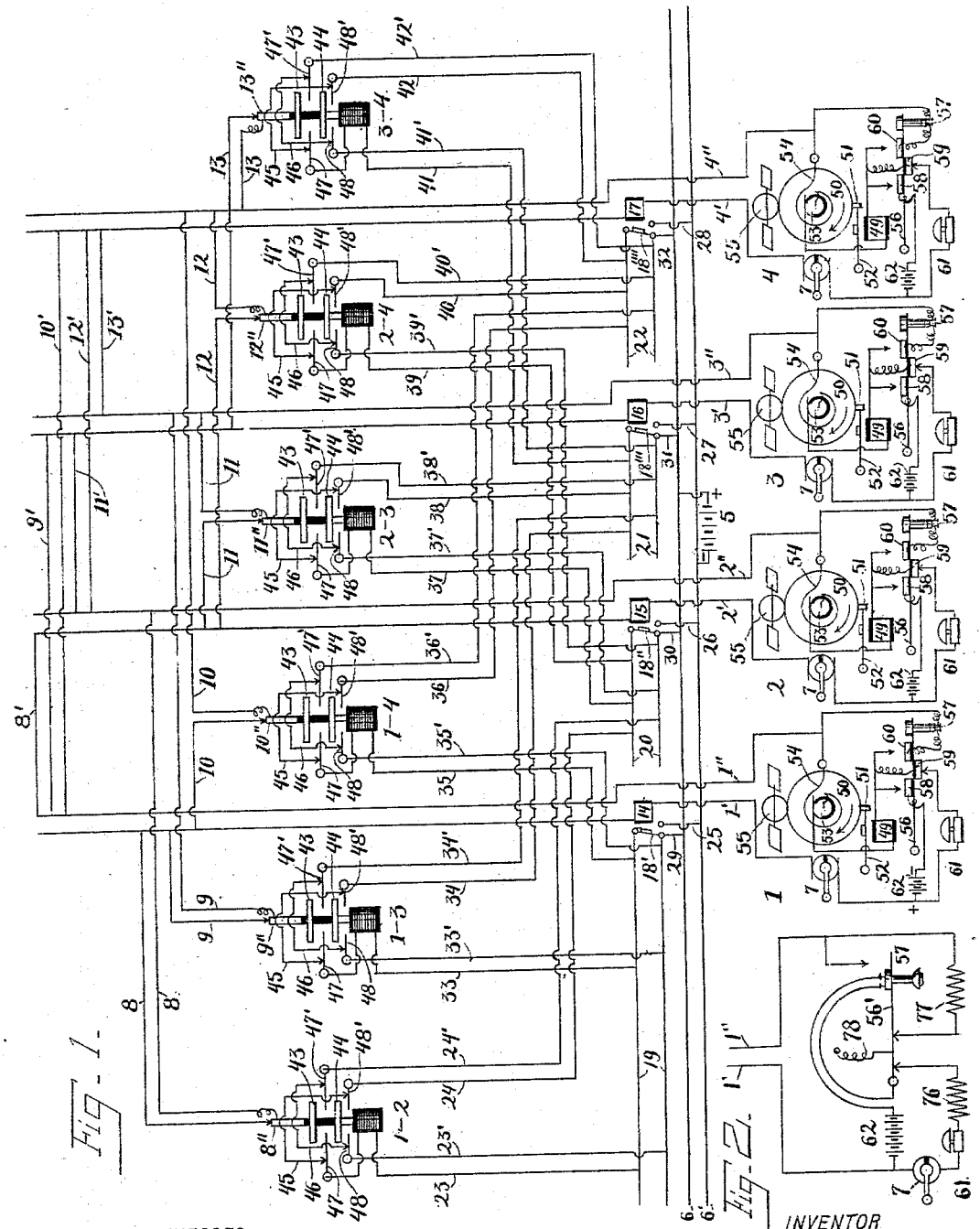
WITNESSES:
Harry J. Perkins.
Emma E. Deghuee
INVENTOR
Wm. F. Lounsbury
BY Edward P. Thompson
ATTORNEY.

UNITED STATES PATENT OFFICE.

WILLIAM F. LOUNSBURY, OF OWEGO, NEW YORK.

AUTOMATIC TELEPHONE-EXCHANGE SYSTEM.

SPECIFICATION forming part of Letters Patent No. 551,391, dated December 17, 1895.

Application filed April 23, 1895. Serial No. 546,815. (No model.)

*To all whom it may concern:*

Be it known that I, WILLIAM F. LOUNSBURY, a citizen of the United States, and a resident of Owego, Tioga county, New York, have invented certain new and useful Improvements in Automatic Telephone-Exchange Systems, of which the following is a specification.

My invention relates to means for obtaining immediate telephonic communication between subscribers' stations in pairs.

A brief of the description and operation as preparatory to the detailed specification is given as follows: I provide a central exchange apparatus, which is connected with any number of sub-stations by respective outgoing and incoming main lines. I dispense with all step-by-step movements, both at the central and at the sub stations. Although there is but one line from the central station to each sub-station and back, yet the connections at the central station are such that any sub-station whatever is electrically connected normally in closed circuits with each remaining sub-station. In this normal condition the system would not be appropriate for the conversation to be held between more than two sub-stations at a time, while all the others would have to wait, because if more than two sub-stations should talk simultaneously with one another there would be a babel of tongues. I provide at the central station a circuit-closer in a normally-closed circuit with each pair of sub-stations. There is a magnet at each one of these circuit-closers, which are caused to be energized or neutralized, according as to whether the circuit-closers are to be opened or closed. If any two sub-stations are connected telephonically together by means of my apparatus, they are each excluded by means of the said circuit-closers from each of the remaining sub-stations, and, further, the latter cannot interrupt either of the communicated sub-stations, but they can in pairs communicate with each other, all in view of the proper operation of the said circuit-closers. These circuit-closers are controlled, as before stated, by magnets, which in turn are magnetized when necessary by means of a local battery at the central station. The magnets have to be shifted from one circuit to another, according to predetermined conditions. Normally they are in respective conductors closed upon themselves without a battery. The object of this kind of a connection is to permit the cutting in of the local battery, and also to permit the shifting of the magnets from one conductor closed upon itself without a battery to another conductor closed upon itself without a battery. These are the three conditions in which more or less of the magnets are placed before, during and after operation of the whole system or any part of it. When the magnet is shifted, as to its connections, by the connecting up of two sub-stations, the shifting is of such a nature that all the circuit-closers which are to be opened belong to those magnets which are thrown into active circuit with the local battery, and all the remaining magnets remain neutral, because they are simply thrown from one conductor closed upon itself without a battery to another conductor closed upon itself without a battery, excepting those magnets belonging to circuit-closers that have no electrical connection with the two sub-stations which are calling each other.

The means for shifting the magnet from the circuit of the one conductor closed upon itself to the circuit of another conductor closed upon itself is effected by means of a pole-changer provided for the circuits of each magnet.

A modification of my invention consists of a simplified sub-station apparatus.

It is found in practice that a certain maximum percentage of the total number of subscribers are communicated in pairs simultaneously at the busiest part of the day. The system is of such a nature that there need be but a small proportion depending upon what this maximum number is of the number of central exchange devices. If it were at all probable that all the subscribers in a large exchange should hold simultaneous telephonic communication in pairs, then it would not be possible to do away with any multiplicity of similar electromagnetic circuit-controllers and pole-changers at the central station.

In order to set forth the detailed construction and operation, drawings are annexed and described.

Figure 1 is a diagram of a complete system, in its simplest form, for the accommodation of four subscribers. The invention could not be well illustrated by a figure showing a less number of subscribers, because it could not be seen easily how two pairs of the subscribers would be holding communication without interfering with each other. Fig. 2 is a diagram of a modified sub-station apparatus.

The organization of the system comprises three general features.

First, the apparatus, located at the sub-stations, which are indicated in the drawings by the numerals 1, 2, 3, and 4, and, consequently, the system represented in Fig. 1 accommodates the telephonic intercommunication of four subscribers. The apparatus at each sub-station may be distinguished from that at the central station as slightly set apart at the lower part of the drawing, and each sub-station is connected by two conductors to the central station.

The second general feature comprises the electromagnetic circuit-controllers at the central station, numbered 1 2, 1 3, 1 4, 2 3, 2 4, 3 4. As will appear hereinafter, this style of numbering the controllers will conveniently represent to the eye the nature of their electrical connections with other elements of the system as a whole.

The third feature involves the circuits classified as follows: One set of circuits is made up of the subscribers' main lines. Thus station No. 1 is connected to certain parts of certain electromagnetic circuit-controllers by the main-line conductors 1' 1''; sub-station 2 to similar devices by main-line conductors 2' 2''; sub-station 3 by main-line conductors 3' 3'', and sub-station 4 by main-line conductors 4' 4''. The connections between these subscribers' circuits and certain portions of certain electromagnetic circuit-controllers are made in various, but predetermined, ways by various connecting-wires arranged in multiple arc, and more fully hereinafter numbered and explained.

There is a second set of electric circuits, easily distinguished from the first because they are what may be termed "local" circuits at the central exchange. The main-line conductors of the local battery 5 are numbered 6 and 6'. Certain connecting-conductors between the local main and certain parts of certain electromagnetic circuit-controllers are arranged and numbered as hereinafter described.

All of that part of the system above the sub-stations 1, 2, 3, and 4 is the central station.

In the normal condition of the subscribers' circuits the sub-station apparatus of any given sub-station is electrically in circuit with the apparatus of each other sub-station.

To aid in the understanding, it should be stated here that the generator for these subscribers' circuits in normal condition is the hand magneto-generator 7. Now the electric circuits from each sub-station to each other sub-station will be set forth: The conductor 8 connects the main line 1' with the main line 2''. The return-circuit is 8'. A conductor 9 connects the main line 1' with the main line 3'', and the return-conductor is 9'. The conductor 10 connects the main line 1' with the main line 4'' and the return-conductor is 10', and in this way the apparatus of the sub-station 1 is shown to be in closed circuits respectively with each of the other sub-stations. The conductor 11 connects the main line 2' with the main line 3'', and the return-conductor is 11'. The conductor 12 connects the main line 2' with the main line 4'', and the return-conductor is 12'. The conductor 13 connects the main line 3' with the main line 4'', and the return-conductor is 13'.

Each of the connecting-conductors, being six in number, is provided with an electromagnetic circuit-closer, the same being numbered in order 8'', 9'', 10'', 11'', 12'', and 13''. These circuit-closers are conveniently the ends of rods projecting upward from the armatures of the electromagnets 1 2, 1 3, 1 4, &c. When the said electromagnets are energized, the circuits of the conductors 8 9 10, &c., are opened.

The local circuits will now be set forth. The battery, as before stated, is 5, and the main line 6 and 6'. The relay-magnets for throwing this battery into circuit with the electromagnetic circuit-controllers are 14 in main line 1', 15 in main line 2', 16 in main line 3', and 17 in main line 4'. The main localbattery lines are provided with supplementary main local lines, which are adapted to be brought into circuit with the battery 5 by means of armature circuit closers 18' 18'' 18''' 18'''', which, respectively, normally connect the said supplementary local mains, which are numbered in pairs 19 20 21 22.

It should be stated here that the relay-magnets 14, 15, 16 and 17 are normally not energized, because the generators 7 are not in operation. The means for energizing them consists of certain batteries, hereinafter described, located at the sub-stations. The magnet 1 2 is connected to the lines 19 by conductors 23 and 23' and to the lines 20 by the conductors 24 and 24' through a polechanger, hereinafter set forth. The path of the circuits of the conductors 19, 20, 23, 23', 24, and 24' is such as to be a closed circuit without a battery, in view of the two circuit-closers 18' and 18'', which, as before stated, electrically connect, respectively, the main lines 19 and 20.

It should be noted that the conductors 23 and 23' connect different main lines of 19, and that the conductors 24 and 24' connect correspondingly-different main lines of 20. The circuit-closers 18' and 18'', when attracted by the respective magnets 14 and 15, move to the right to the local-battery terminals 25 and 26. By this means one of the main lines of 19 and 20 is connected to one pole of the local battery 5. The other ones of the main lines 19 and 20 are permanently connected by conductors 29 and 30 to the other pole of the same battery. Similar connections exist between the other magnets and the various supplementary main lines. Thus, the magnet 1 3 is connected by conductors 33 and 33', respectively, to the upper and lower main lines 19, and by conductors 34 and 34', respectively, to the upper and lower main lines 21, there being, as before, a pole-changer, controlled by the magnet 1 3, included in metallic circuit, this time, with the circuit-closers 18' and 18'''. When these said circuit-closers are attracted by their magnets 14 and 16, the local battery 5, in a similar way, as above stated with respect to certain other circuits, is thrown into circuit with the magnet 1 3. It should be remembered that as all the parts cannot be described simultaneously the statement of the operation is postponed until later, but it may be stated here incidentally that when the above circuit-closers 18' and 18''' are simultaneously closed equal but opposite currents from the local battery 5 tend to pass through the magnet 1 3. Passing now on to the circuits of the magnet 1 4, it may be stated that the same is connected respectively to the upper and lower main lines 19 by conductors 35 and 35', and to the respective upper and lower lines 22 by conductors 36 and 36', there being included, as before, a pole-changer, controlled by the magnet 1 4, and also circuit-closers, as before 18' for the lines 19 and 18'''' for the lines 22.

In order that the description may be complete in detail, it may be stated that the magnet 2 3 is connected by conductors 37 and 37' respectively with the upper and lower lines of 20 and by conductors 38 and 38', respectively, with the upper and lower conductor 21, the circuit being metallically completed through a pole-changer controlled by magnet 2 3 and by the circuit-closers 18'' and 18'''. Similarly the magnet 2 4 is connected by conductors 39 and 39', respectively, with the upper and lower lines 20, and by conductors 40 and 40', respectively, with the upper and lower lines 22 through a pole-changer controlled by the magnet 2 4 and through the circuit-closers 18'' and 18''''. Finally, the magnet 3 4 is connected by conductors 41 and 41', respectively, to the upper and lower lines 21, and by conductors 42 and 42', respectively, with the upper and lower lines 22 through a pole-changer controlled by the magnet 3 4 and through a circuit-closer 18''' and 18''''.

The pole-changers of the different magnets are all alike, and, therefore, the description of one applies to all. Each pole-changer has two movable circuit-closers 43 and 44, insulated from each other, and adapted, when attracted by the controlling-magnet, to both depress and close certain spring-terminals. In the first pole-changer, measuring from the left of the first sheet, the circuit-closer 43 connects and depresses the terminals of the conductors 23 and 24'; in the second pole-changer the circuit-closer 43 connects and depresses the conductors 33 and 34'; in the third it connects and depresses the terminals of the conductors 35 and 36'; in the fourth, the terminals of conductors 37 and 38'; in the fifth, the terminals of conductors 39 and 40', and in the sixth, the terminals of the conductors 41 and 42'. The above closing and depressing takes place when the several magnets are energized, and at the same time the circuit-closers 44 connect together in pairs the remaining conductors that connect the magnets 1 2, 1 3, 1 4, &c., to the lines 19 20, &c.

Normally the pole-changers are so connected by conductors 45 and 46 that in the first the spring-terminal 47 of the conductor 23 is connected to the spring-terminal 48' of the conductor 24, and the spring-terminal 48 of the conductor 23' is connected to the spring-terminal 47' of the conductor 24'. In the second pole-changer, the conductor 45 connects the spring-terminal 47 of the conductor 33 with the spring-terminal 48' of the conductor 34, and the conductor 46 connects the spring-terminal 48 of the conductor 33' with the spring-terminal 47' of the terminal 34'. In the third pole-changer, a conductor 45 connects the spring-terminal 47 of the conductor 35 with the spring-terminal 48' of the conductor 36, and the conductor 46 connects the spring-terminal 48 of the conductor 35 to the spring-terminal 47' of the conductor 36'. In the fourth pole-changer, a conductor 45 connects the spring-terminal 47 of the conductor 37 to the spring-terminal 48 of the conductor 38', and the conductor 46 connects the spring-terminal 48 of the conductor 37' to the spring-terminal 47' of the conductor 38'. In the fifth pole-changer, the conductor 45 connects the spring-terminal 47 of the conductor 39 to the spring-terminal 48' of the terminal 40, and the conductor 46' connects the spring-terminal 48 of the conductor 39' to the spring-terminal 47' of the conductor 40'. In the sixth pole-changer, the conductor 45 connects the spring-terminal 47 of the conductor 41 to the spring-terminal 48' of the conductor 42, and the conductor 46 connects the spring-terminal 48 of the conductor 41' to the spring-terminal 47' of the conductor 42'.

The different spring-terminals 47' and 48' are so arranged that when depressed by the circuit-closers 43 and 44 they are entirely moved out of contact with the conductors 45 and 46, thereby producing differences in the manner of connecting up the circuits.

As a part of the construction and the normal condition of the system, it should be stated that the magnets 1 2, 1 3, 1 4, &c., are so connected that they are in the circuit of conductors closed upon themselves, exclusively of a battery, so that although they are in the circuit of closed conductors they are not magnetized. In order to show this by reference to the drawings, it may be noticed in regard to the magnet 1 2 that its terminal conductors 23 and 24 are connected to the respective upper lines of 19 and 20, and that these upper lines are connected to a common pole of the battery 5, respectively, through the circuit-closers 18' and 18'', the conductors 29 and 30, and finally to the positive pole of the battery 5. In order to illustrate this further, and to show that there is no confusion in the system, it may be noticed that the terminal conductors 33 and 34 of the magnet 1 3 are connected to the upper lines of 19 and 21, and that these, by apparent connections, are connected to but one pole of the battery—namely, the positive pole. In regard to magnet 1 4, its terminal conductors 35 and 36 are connected to the upper lines of 19 and 22, which are connected to the positive pole of the battery. Similarly the magnet 2 3 is connected to the positive pole of the battery, as may be seen by noticing the conductors 37 and 38, the upper lines of 20 and 21 and the electrical connections between the positive pole of the battery and said upper lines.

The circuit of the conductor which includes the magnet 2 4 is as follows: Begin at the positive pole of the battery; go to the line 6, then to the conductor 30, to the circuit-closer 18'', to the conductor 39, through the pole-changer to the conductor 40, to the upper line of 22, to the circuit-closer 18'''', to the conductor 32, and back again to the conductor 6. The connections of the magnet 3 4 are of exactly the same nature.

Without taking into account at present the nature of the sub-stations it may be stated generally that when, for example, the subscribers of the stations 1 and 3 are actually holding communication, the relay-magnets 14 and 16 are energized, the action taking place simultaneously, so that the circuit-closers 18' and 18''' are thrown to the right-hand terminals 25 and 27, respectively. In this manner the magnet 1 3 will exist in a conductor closed upon itself, but in a different one from formerly. This may be traced out as follows: The terminal conductors 33 and 34 become connected through the conductors 25 and 27 both to the negative pole or line 6'. In this manner stations 1 and 3 are kept in circuit through the circuit-closer 9''. At the same time the circuit-closers 8'', 10'', 11'', and 13'' become opened for the following reasons: Take first circuit-closer 8''. As circuit-closer 18'' remains in its normal condition while the circuit-closer 18' is moved to the right, it follows that the terminal conductor 23 becomes connected to the negative pole while the terminal conductor 24 remains connected to the positive pole. Consequently there is a current from the local battery passing through the magnet 1 2, causing it to operate its armature and open the circuit at the circuit-closer 8''. No attention need now be paid to the pole-changer, because the function of this comes into play when two other subscribers wish to hold communication without waiting for subscribers 1 and 3 to stop talking, and, at the same time, without interrupting them. The circuit-closer 10'' becomes opened for the following reasons: The terminal conductor 35 becomes connected to the negative pole, because the circuit-closer 18' has been put into connection with the conductor 25, while the terminal conductor 36 remains connected to the positive pole of the battery because the circuit-closer 18'''' remains in its normal position. The circuit-closer 11'' becomes opened because the terminal conductor 37 remains in connection with the positive pole of the battery because the circuit-closer 18'' is in its normal position while the terminal conductor 38 becomes connected with the negative terminal of the local battery 5. The circuit-closer 13'' becomes open because the terminal conductor 41 is connected to the negative pole of the battery because of the abnormal condition of the circuit-closer 18''', while the terminal conductor 42 remains connected with the positive pole.

The first thing that becomes necessary to understand about the sub-station apparatus is the mechanical construction without regard to its relation to the central-station apparatus. As before stated, 7 represents the hand magneto-machine, 49 represents a magnet, and 50 a wheel, prevented from rotating in the direction of the arrow by being provided with a projection 51, pressing against the end of an armature-spring 52 belonging to the magnet 49. The wheel carries a rotary circuit-closer 53, adapted to maintain the circuit closed during a part of its rotation, and to keep the circuit open during the remainder of the rotation. The wheel 50 is supposed to be wound up against the action of a spring 54, which serves also as an electric connector to the circuit-closer 53. The wheel 50 when released by the spring-armature is caused to rotate slowly and practically uniformly by means of the resistance or fan wheel 55. There is a spring-lever 56 held down by the weight of the telephone 57. The spring 56 carries three insulated contacts 58, 59, and 60. The circuits at the sub-stations are connected up as follows: Passing from the main line 1', the circuit is normally closed through the generator 7, and electric bell 61, contact 59, magnet 49, circuit-closer 53, spring 54, and then to the main line 1''. There is a branch circuit to the circuit just described and normally open, and passing through a battery 62 to the contact 58, where it is normally open, to the magnet 49, to the circuit-closer 53, to the spring 54, and then to the main line 1''. There is another normally-open branch circuit, the same being from the main line 1', through the battery 62; the contact 58 adapted to be closed with the contact 60 when the telephone is removed, then through the telephone 57, and then to the main line 1''.

Having now set forth the construction of the system, I will state the operation by assuming, first, that station No. 1 is to call and hold communication with station No. 3, and that while their telephones are in circuit, I will give the second step by showing how two other stations may hold telephonic communication without interfering with that between stations 1 and 3. The other two stations, of course, will be 2 and 4, but what holds true with reference to the four sub-stations will hold true for a system built for any number of sub-stations.

Say that station No. 1 wishes to call and hold conversation with station No. 3. No. 1 operates the generator 7 by a certain number of turns agreed upon by stations No. 1 and No. 3. The same signal will be received at sub-stations 2 and 4, but they have agreed not to pay any attention to that signal. The current generated by the generator 7 at sub-station 1 energizes all the magnets 49 which control all the wheels 50. As it takes a little time for the signal to be given, the circuit is maintained during a portion of the revolution of the circuit-closers 53 until the parts thereof, marked in black, and while those parts move in contact with the terminals of the magnets 49. Simultaneously with the operation of the generator 7 the bells 61 ring. In fact, these are call-bells, and they ring for a certain interval of time, and until the circuits are interrupted at the circuit-closers 53. The instructions given to the subscribers are such that when any one of them hears his call he must, during the time that the circuit-closers 53 are open, take off his particular telephone 57. So must also the calling subscriber. He may take off his telephone as soon as the circuit-closers 53 are open. By the operation of removing the telephones at sub-stations 1 and 3, and while the circuit is broken at the circuit-closers 53, the batteries 62 at these two sub-stations only are thrown into circuit with the lines 1', 1", 3', and 3", thereby energizing the relay-magnets 14 and 16. This closed battery-circuit may be traced as follows: Beginning at the positive pole of the battery 62 at the sub-station No. 1, pass through the generator 7, which is now quiet, to the main line 1', to relay-magnet 14, to conductor 9, through circuit-closer 9'', to line 3'', to both the telephones by way of contact 60, to contact 58, both of the contacts being closed against the arrows, to the negative pole of the battery 62, to the positive pole, to the generator 7, now at rest, to the line 3', to the relay-magnet 16, to the connecting-line 9', to the main line 1", and, finally, through the following elements of sub-station 1, namely: the telephone 57, the contact 60, the contact 58, by way of the two arrows just above them which are now closed, to the negative pole of the battery 62, and, finally, to the starting-point—the positive pole of the same battery. It will be noticed, therefore, that if a subscriber at sub-station 3, as well as the subscriber at sub-station 1, takes off his telephone while the circuit-closers 53 at all the stations are open a battery-circuit will send a current for energizing the relay-magnets 14 16.

If the subscriber at sub-station 3 does not take off his telephone 57 before his circuit-closer 53 has become again closed, the instructions are that the subscriber at station No. 1 should call sub-station No. 3 again just as soon as the former's circuit-closer 53 has become closed. By showing the reason of the necessity of ringing subscriber No. 3 up again the invention and its operation will be more positively understood. If the subscriber at sub-station No. 3 does not take off his telephone while the circuit-closer 53 is open, then his battery 62 will not be in circuit, but battery 62 at sub-station 1 will be in circuit. The consequence of this is that the only relay-magnet which becomes energized is 14, and it becomes energized only intermittently for the following reason: It operates upon the circuit-closers 8", 9", and 10" like an ordinary vibrating electric bell. When the magnet 14 attracts the circuit-closer 18', a circuit is formed through the magnets 12, 13, and 14, causing them to open the circuit-closers 8", 9", and 10", and therefore the circuit of the relay-magnet 14 becomes open. Therefore, all that the subscriber at sub-station No. 1 can do if he gets no answer from the subscriber at sub-station No. 3 before the complete rotation of the wheel 50 is to ring up again. On the other hand, just as soon as the subscriber at sub-station No. 3 removes his telephone, he has instantaneous communication with the subscriber at sub-station No. 1, provided only that he removes the telephone before the closing of the circuit-closers 53. The system is, therefore, what may appropriately be termed a "system of instantaneous intercommunication."

The system is, further, of such a nature that it is not necessary for the circuit-closers 53 to be accurately synchronous in their operation. They are so proportioned that they require a little time, say about a minute or two, or any other period desired, for making a complete rotation. It is evident that they will all start off at the same time, and it is true that whether they are synchronous or not it is only necessary for the called subscriber to remove his telephone before the circuit-closer 53 at sub-station 1 becomes closed. It is evident that if the circuit-closers 53 start to rotate at the same time they may be sufficiently accurately constructed to stop roughly at about the same time. The subscriber at sub-station No. 1 may now hold communication with the subscriber at sub-station No. 3, and they may continue to do so as long as they please and without interruption, in view of the pole-changers.

It will now be shown how sub-stations 2 and 4 may be telephonically connected without interfering with the communication between sub-stations 1 and 3 and without being interfered with by them.

The subscribers at sub-stations 2 and 4 go through the same operation as related regarding the other two subscribers. Consequently the relay-magnets 15 and 17 become energized, and the circuit-closers 18″ and 18″″ become attracted and connect the upper lines of 20 and 22 to the negative pole of the battery 5, while the lower lines of 20 and 22 remain connected with the positive pole. The connections of the lines 19 and 21 have been changed so as to become the same as just described in reference to the lines 20 and 22. The circuits may now be traced in order to show that magnet 1 3 remains neutral, and, therefore, that the circuit-closer 9″ remains closed.

The manner in which the magnet 1 3 is electrically connected up is as follows: Start at the negative pole of the battery 5 and go to the conductor 27, to the circuit-closer 18‴, to the upper line of 21, to the conductor 34, to the spring-terminal 48′, to the spring-terminal 47, to the magnet 1 3, to the upper line of 19, to the circuit-closer 18′, and back to the negative pole of the battery 5. Therefore the magnet 1 3 is included in a conductor closed upon itself without a battery, and consequently the circuit-closer 9″ remains closed, and the subscribers at sub-stations 1 and 3 may continue their conversation.

To show that the subscribers at sub-stations 2 and 4 are properly electrically and telephonically connected when the relay-magnets 15 and 17 are energized, the circuit-closer 12″ should be found closed—that is, the magnet 2 4 should be found neutral. Its circuit may be traced as follows: Start from the negative pole of the battery 5, then go to the lower line 6′, then to the conductor 26, to the circuit-closer 18″ to the upper line of 20, to the line 39, to the magnet 2 4, to the spring-terminal 47, to the conductor 45, to the spring-terminal 48′, to the conductor 40, to the upper line of 22, to the circuit-closer 18″″, to the conductor 28, and back to the negative pole of the battery 5. Consequently the magnet 2 4 is in a conductor closed upon itself without a battery, and the circuit-closer 12″ continues to connect electrically the telephones at sub-stations 2 and 4.

It should now be shown how sub-stations 2 and 4 are not connected electrically to sub-stations 1 and 3. To this end it should be found that the circuit-closers 8″, 10″, 11″, and 13″ are open. It has already been shown that when 1 and 3 are connected the magnet 1 2 was energized. It remains energized although the circuit-closer 18″ has been connected to the conductor 26. The magnet 1 2 having been energized connects the spring-terminal 47 to spring-terminal 47′, and spring-terminal 48 to spring-terminal 48′, while the conductors 45 and 46 have been cut out. The circuit, therefore, is from the positive pole of the battery 5 to the upper line 6, to the conductor 29, to the conductor 23′, to the spring-terminal 48, directly across to the spring-terminal 48′, to the conductor 24, to the upper conductor of lines 20, to the circuit-closer 18″, to the conductor 26, to the negative pole of the battery. This circuit just traced does not include the magnet. The one which includes the magnet is as follows: from the positive pole of the battery 5, to the upper line 6, to the conductor 30, to the conductor 24′, to the spring-terminal 47′ directly across to the spring-terminal 47, to the magnet 1 2, to the conductor 23, to the upper line of 19, to the circuit-closer 18′, to the conductor 25, to the negative terminal of the same battery 5, and back to the starting or positive pole of the said battery 5. It will be found that the magnet 1 4 is in an electric circuit as follows, it being remembered that the circuit-closers 18′ 18″, &c., are all moved to the right: Start at the positive pole of the battery 5 to the upper line 6, to the conductor 32, to the conductor 36′, to the spring-terminal 47′ across to the spring-terminal 47 to the magnet 1 4, to the conductor 35, to the upper line of 19, to the circuit-closer 18′, to the conductor 25, to the lower line 6′, and, finally, to the negative pole of the same battery. In a similar manner those versed in the art may find that magnet 3 4 is also energized.

When the parties have finished their conversation they may replace their telephones 57, either simultaneously or in any order whatever of time, and yet the system will become restored to its normal condition exactly as soon as all the telephones are suspended upon the springs 56.

A modification of the sub-station apparatus is shown in Fig. 2, the purpose being to dispense with the circuit-closer 53 and accompanying mechanism and magnet 49. The exact construction is thus: One sub-station apparatus only is shown in Fig. 2, but they would all be alike. The generator 7 is in circuit with the lines 1′ 1″ and with the bell 61, as before, and to these are added the equal electric resistances 76 and 77, between which is a portion of a lever, acting as a circuit-closer 56′, normally closed, and held closed against a spring 78 by the telephone 57. The telephone, as before, is in open circuit with the battery 62, connected across lines 1′ 1″ above the generator 7 and said resistances. When the telephone is removed the resistances 76 and 77 are cut out and the battery 62 and telephone 57 are cut in. If sub-station 1 has rung up sub-station 3, then both parties remove their telephones and a battery-circuit is closed through magnets 14 and 16 with full strength, accomplishing the same result as by the sub-station apparatus in Fig. 1; but in view of the resistances 76 and 77 at the other sub-stations the magnets 15 and 17 are not energized, because the batteries and resistances are properly proportioned for this purpose. If it were not for the resistances, magnets 15 and 17 would also be energized, which is exactly what is not wanted, as may be known from description of Fig. 1. The same operation occurs if sub-stations 2 and 4 are connected, and also, if after 1 and 3 are connected 2 and 4 are to be connected, then will the ringing and cutting in of the telephones occur without interfering with or being interfered with by sub-station apparatus at 1 and 3, or with or by any other sub-stations if more than four are in the system.

I claim as my invention—

1. An automatic telephone exchange system, consisting of the combination of a given number of telephones located at respective sub-stations, independent electric conductors connecting each telephone with all the other telephones respectively, a circuit closer in circuit with each of the said conductors, and means located at the central station, governed by devices located at the sub-stations for controlling said circuit closers in a predetermined manner.

2. An automatic telephone exchange system, consisting of the combination of a given number of telephones, located at respective sub-stations, independent electric conductors connecting each telephone with all the other telephones, respectively, a circuit closer in circuit with each of the said conductors, a magnet for each circuit closer, a given electric generator, a pair of electric conductors closed each upon itself for each magnet, one of the conductors normally including the magnet in each case, and means for changing for the purpose set forth, some of the magnets, each from one conductor closed upon itself to the other conductor closed upon itself, and for including in circuit with the said generator some of the said conductors in pairs and in series with each other.

3. An automatic telephone exchange system, consisting of the combination of a given number of telephones, located at respective sub-stations, independent electric conductors connecting each telephone with all the other telephones, respectively, a circuit closer in circuit with each of the said conductors, a magnet for each circuit closer, a given electric generator, a pair of electric conductors closed each upon itself for each magnet, one of the conductors normally including the magnet in each case, and means for changing, for the purpose set forth, some of the magnets each from one conductor closed upon itself to the other conductor closed upon itself, and for including in circuit with the said generator some of the said conductors in pairs and in series circuit with each other, said means consisting of electro-magnetic switches, whose magnets are in circuit with given sub-station generators, and whose switches are normally included both in circuit with groups of said pairs of conductors, and in open circuit with said first named generator.

4. An automatic telephone exchange system, consisting of the combination of a given number of telephones, located at respective sub-stations, independent electric conductors, connecting each telephone with all the other telephones, respectively, a circuit closer in circuit with each of the said conductors, a magnet for each circuit closer, a given electric generator, 5, a pair of electric conductors for each magnet closed respectively upon themselves, one of the conductors normally including one of said magnets, electro-magnetic switches whose magnets 14, 15, 16, &c., are in circuit with given sub-station generators 7, and whose switches are normally included both in circuit with groups of said pairs of conductors, and in open circuit with generator 5, signals at the sub-stations in closed circuit with the generators 7, generators 62 in open circuit with generators 7, and including circuit closers for opening the circuits of the generators 7 for a predetermined period, and means both for closing the circuits of the generators 62, through the magnets 14, 15, 16, &c., and for opening the circuits of generators 7.

5. An automatic telephone exchange system, consisting of the combination of a given number of telephones located at respective sub-stations, independent electric conductors connecting each telephone with all the other telephones respectively, a circuit closer in circuit with each of the said conductors, and means located at the central station, governed by devices located at the sub-stations for controlling said circuit closers in a predetermined manner, said devices consisting of resistances and generators normally in closed circuits with said circuit closers, and batteries normally in an open circuit with said circuit closers and said telephones, and a switch 56' for cutting out the said generators and said resistances, and for cutting in the said batteries and telephones.

In testimony that I claim the foregoing as my invention I have signed my name, in presence of two witnesses, this 19th day of April, 1895.

WILLIAM F. LOUNSBURY.

Witnesses:
W. G. HAVENS,
LESTER SHAY.